United States Patent
Nawa (10) Patent No.: US 6,710,971 B2
(45) Date of Patent: Mar. 23, 2004

(54) INTERPOSE LEVER WHICH CAN BE REDUCED IN NUMBER OF COMPONENTS AND ASSEMBLING STEPS AND TAPE DRIVE USING THE SAME

(75) Inventor: Ikuichiro Nawa, Atsugi (JP)

(73) Assignee: Mitsumi Electric Co., Ltd., Tokyo (JP)

(*) Notice: Subject to any disclaimer, the term of this patent is extended or adjusted under 35 U.S.C. 154(b) by 226 days.

(21) Appl. No.: 10/006,629

(22) Filed: Nov. 8, 2001

(65) Prior Publication Data

US 2002/0057534 A1 May 16, 2002

(30) Foreign Application Priority Data

Nov. 10, 2000 (JP) ........................ 2000-343018

(51) Int. Cl.[7] ............................. G11B 15/675
(52) U.S. Cl. ................................... 360/96.5
(58) Field of Search ........................ 360/96.5

(56) References Cited

U.S. PATENT DOCUMENTS

| 5,214,548 A | * | 5/1993 | Nakanishi | ................ 360/96.5 |
| 5,793,574 A | | 8/1998 | Cranson et al. | |
| 5,862,014 A | | 1/1999 | Nute | |
| 6,095,445 A | * | 8/2000 | Hentrich | ................ 360/96.5 |
| 6,310,745 B1 | * | 10/2001 | Smith | ................ 360/96.5 |
| 6,320,722 B1 | * | 11/2001 | Tsuchiya et al. | ......... 360/96.5 |

FOREIGN PATENT DOCUMENTS

JP 2000-149491 A 5/2000

* cited by examiner

Primary Examiner—Robert S. Tupper
(74) Attorney, Agent, or Firm—Frishauf, Holtz, Goodman & Chick, P.C.

(57) ABSTRACT

In an interpose lever (60) for holding in a tape drive (10) a tape cartridge (20) formed with a recess (21) thereon, a movable base (11a) has a protrusion (614) to be engaged with the recess to inhibit the tape cartridge from being released. A release arm (63) is rotatably attached to the base for releasing engagement between the protrusion and the recess. The release arm is urged by a spring (64) in a predetermined rotating direction. A shaft (617) is formed integral with the base to serve as a rotation center member of the release arm.

12 Claims, 11 Drawing Sheets

FIG. 1
EARLIER TECHNOLOGY

FIG. 2
EARLIER TECHNOLOGY

FIG. 3
EARLIER TECHNOLOGY

FIG. 4
EARLIER TECHNOLOGY

FIG. 5
EARLIER TECHNOLOGY

INTERPOSE LEVER WHICH CAN BE REDUCED IN NUMBER OF COMPONENTS AND ASSEMBLING STEPS AND TAPE DRIVE USING THE SAME

BACKGROUND OF THE INVENTION

This invention relates to a tape drive for use in a linear tape storage system represented by DLT (Digital Linear Tape) or LTO (Linear Tape Open) and, in particular, to an interpose lever for holding a tape cartridge (or a tape cassette) in a tape drive.

A linear tape storage system of the type has been developed as a backup for a computer system. A variety of linear tape storage systems have heretofore been proposed. For example, a digital linear tape drive as the DLT is disclosed in U.S. Pat. No. 5,862,014.

The digital linear tape drive is adapted to receive a tape cartridge having a single supply reel. The digital linear tape drive includes a take-up reel in the interior thereof. When the tape cartridge is received in the tape drive, a magnetic tape is pulled out from the tape cartridge to be taken up by the take-up reel through a head guide assembly. The head guide assembly serves to guide to a magnetic head the magnetic tape pulled out from the tape cartridge. The magnetic head exchanges information to and from the magnetic head.

Typically, a tape drive comprises a generally rectangular housing having a common base as disclosed in U.S. Pat. No. 5,793,574 for example. The base has two spindle motors. The first spindle motor has a permanently mounted spool as a take-up reel permanently mounted to the base and dimensioned to accept a magnetic tape streaming at a relatively high speed. The second spindle motor is adapted to receive a removable tape cartridge.

The tape cartridge is manually or automatically inserted into the drive via a slot formed on a housing of the drive. When the tape cartridge is inserted into the slot, the cartridge is engaged with the second spindle motor. Prior to rotation of the first and the second spindle motors, the tape cartridge is connected to the permanently mounted spool by means of a mechanical buckling mechanism. A number of guide rollers are positioned between the tape cartridge and the permanently mounted spool and guide the magnetic tape as it streams at a relatively high speed back and forth between the tape cartridge and the permanently mounted spool.

The tape drive further comprises a head assembly. The head assembly is positioned between the spool and the tape cartridge along a tape path defined by a plurality of rollers. During operation of the tape drive, the magnetic tape streams along the tape path between the spool and the tape cartridge, coming into close proximity to the head assembly while streaming. An example of the head assembly is disclosed in U.S. Pat. No. 5,793,574 mentioned above. Japanese Unexamined Patent Publication No. 2000-149491 (JP 2000-149491 A) discloses an example of the tape cartridge to be received in the digital linear tape drive.

After the tape cartridge is inserted into the tape drive, it is necessary to hold the tape cartridge at a proper position. For this purpose, the tape drive is provided with an interpose lever for holding the tape cartridge. After completion of information exchange upon the magnetic tape, the magnetic tape is rewound into the tape cartridge. Thereafter, by an eject mechanism operated by an operator, the tape cartridge is ejected from the tape drive. In order to eject the tape cartridge, it is necessary to release holding of the tape cartridge by the interpose lever.

In view of the above, the interpose lever comprises a movable base having a protrusion to be engaged with a recess formed on the tape cartridge, a release arm for releasing engagement between the protrusion and the recess, and a shaft as a separate component to which the release arm is attached to be rotatable with respect to the base.

However, the above-mentioned tape drive requires the shaft to be provided as another component separate from the base and the release arm. In addition, an E ring constituting a thrust bearing is also required. Thus, the number of components of the interpose lever is increased so that an assembling efficiency is decreased. As a consequence, it is difficult to reduce the cost of the interpose lever.

SUMMARY OF THE INVENTION

It is therefore an object of this invention to provide an interpose lever which can be reduced in number of components.

It is another object of this invention to provide an interpose lever which can be reduced in number of assembling steps.

It is still another object of this invention to provide an interpose lever which can reduced in cost.

It is yet another object of this invention to provide an inexpensive tape drive which can be reduced in number of components and in number of steps.

According to this invention, there is provided an interpose lever for holding a removable tape cartridge in a tape drive. The interpose lever comprises a movable base having a protrusion to be engaged with a recess formed on the tape cartridge to inhibit the tape cartridge from being released, a release arm rotatably attached to the base for releasing engagement between the protrusion and the recess, urging means for urging the release arm in a predetermined rotating direction, and a shaft formed integral with the base to serve as a rotation center member for the release arm.

According to this invention, there is also provided a tape drive which comprises a housing having a slot for receiving a tape cartridge containing a tape, an interpose lever as mentioned above, the interpose lever being assembled to the housing, and a tape driving mechanism assembled to the housing for moving the tape in the tape cartridge loaded in the slot.

BRIEF DESCRIPTION OF THE INVENTION

DESCRIPTION OF THE PREFERRED EMBODIMENT

In order to facilitate an understanding of this invention, description will at first be made of an existing tape drive.

Figure 1:
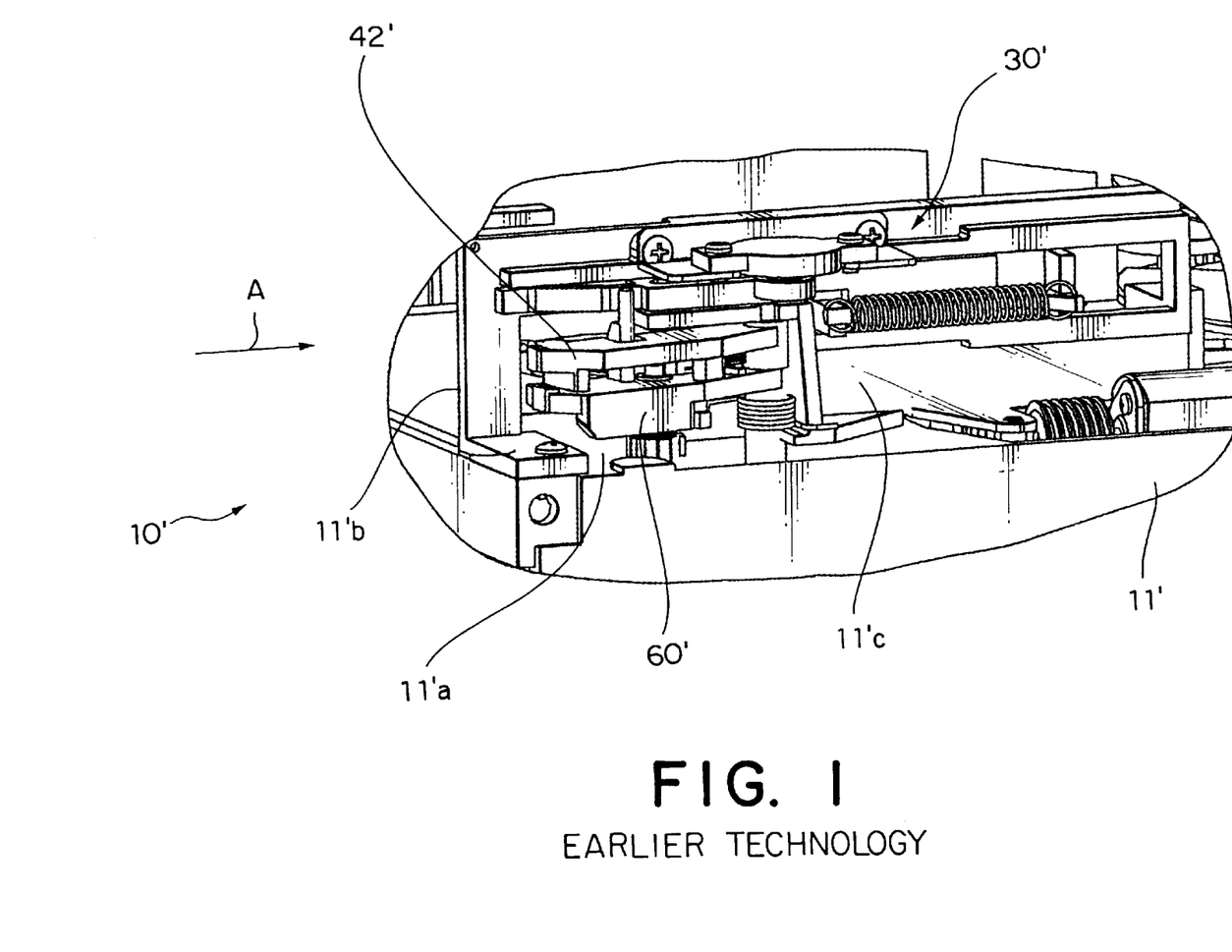
FIG. 1 is a perspective view of a part of an existing tape drive in a state where an upper cover is removed.

Referring to FIG. 1, a tape drive 10' is adapted to receive a removable tape cartridge (not shown) and contains a take-up reel (not shown) therein. The take-up reel may be called a spool. The tape drive 10' comprises a generally rectangular housing 11' having a common base 11'a. The base 11'a has two spindle motors (not shown). The first spindle motor has a permanently mounted spool or take-up reel permanently mounted to the base 11'a and dimensioned to accept a magnetic tape (not shown) streaming at a relatively high speed. The second spindle motor is adapted to receive the tape cartridge. The tape cartridge is manually or automatically inserted into the tape drive 10' via a slot 11'b formed on the housing 11' of the drive 10' in an inserting direction depicted by an arrow A.

When the tape cartridge is inserted into the slot 11'b, the cartridge is engaged with the second spindle motor in a known manner. Prior to rotation of the first and the second spindle motors, the tape cartridge is connected to the permanently mounted spool by means of a mechanical buckling mechanism (not shown). A number of guide rollers (not shown) are positioned between the tape cartridge and the permanently mounted spool and guide the magnetic tape as it streams at a relatively high speed back and forth between the tape cartridge and the permanently mounted spool.

The tape drive 10' further has a right side wall or right receiver 11'c at which an interpose lever 60' is rotatably attached onto the base 11'a. An existing eject mechanism 30' is attached to the one surface of the right receiver 11'c of the tape drive 10'. Above the interpose lever 60', a write protect arm 42' is rotatably attached to be coaxial with a rotation axis of the interpose lever 60'.

Referring to FIGS. 2 through 5 in addition to FIG. 1, description will be made of the interpose lever 60'.

Figure 2:
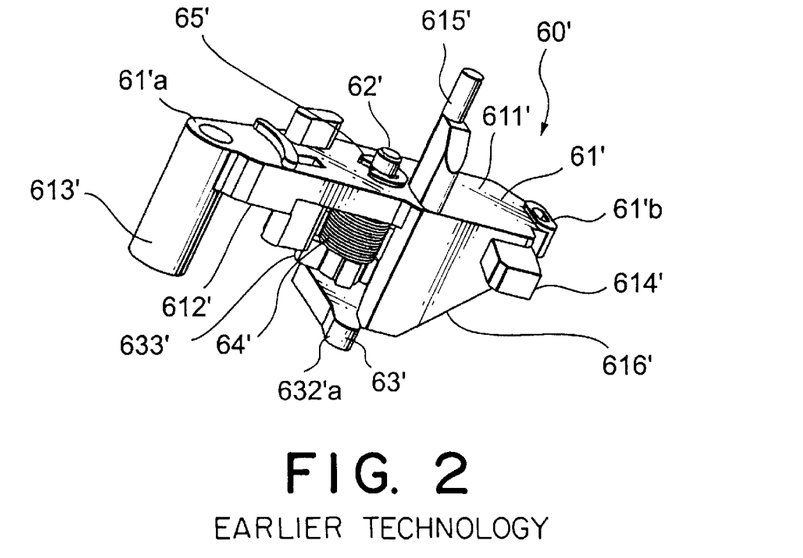
FIG. 2 is a perspective view of an interpose lever used in the tape drive illustrated in FIG. 1.
Figure 3:
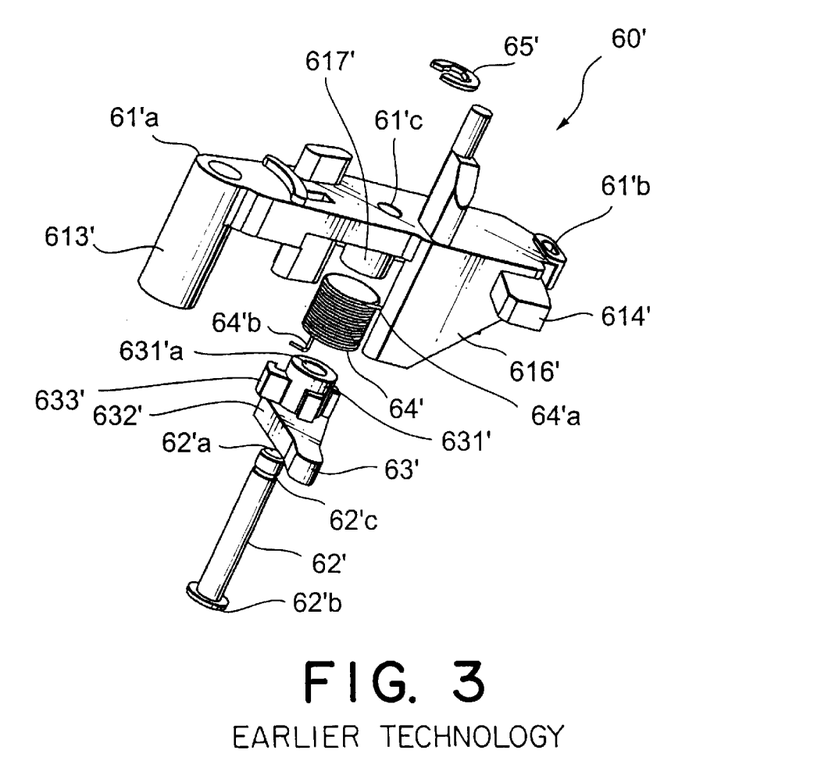
FIG. 3 is an exploded perspective view of the interpose lever illustrated in FIG. 2.

The interpose lever 60' comprises a base 61' having an upper surface 611' and a lower surface 612', a shaft 62', a release arm 63', a spring 64', and an E ring 65'.

Figure 4:
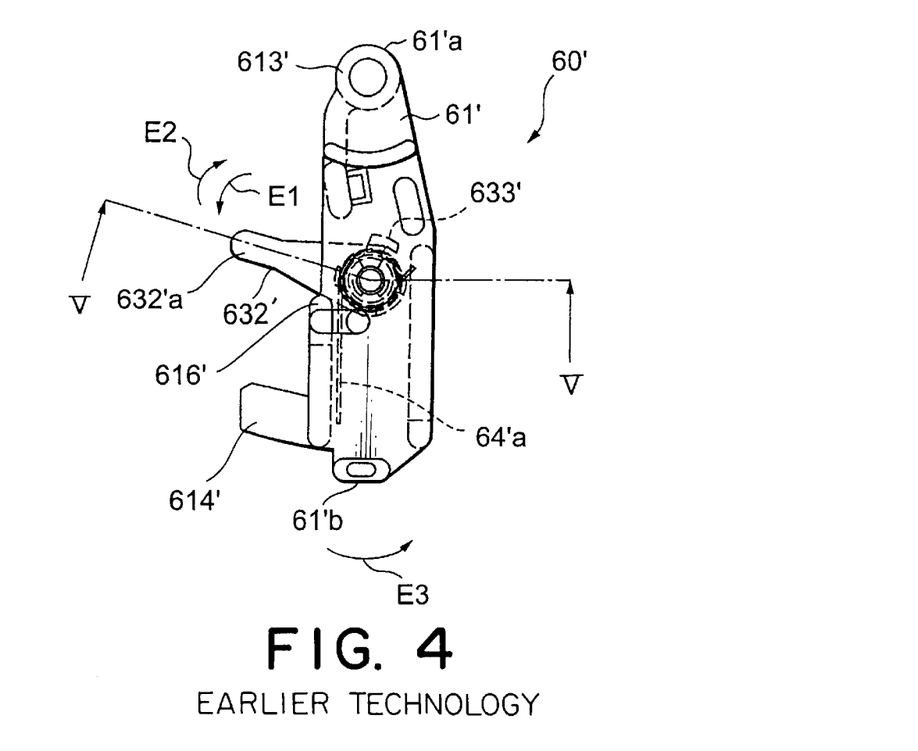
FIG. 4 is a plan view of the interpose lever illustrated in FIG. 2.

The base 61' is provided with a first cylindrical member 613' formed at its one end 61'a and extending downward from the lower surface 612' to serve as the rotation axis of the interpose lever 60'. Furthermore, the base 61' is provided with a protrusion 614' formed at its the other end 61'b and protruding towards the right receiver 11'c (FIG. 1). The base 61' is provided with a rod member 615' formed at its general center near to the other end 61'b and extending upward from the upper surface 611'. The base 61' is provided with a trapezoidal engaging portion 616' formed between its center and the other end 61'b on the side of the right receiver 11'c and extending downward from the lower surface 612' to engage one end 64'a of the spring 64' which will later be described. As illustrated in FIGS. 2 and 4, the trapezoidal engaging portion 616' also serves as a stopper for limiting an operation (rotation) range of the release arm 63' which will later be described. Furthermore, the base 61' is provided with a second cylindrical member 617' formed at its general center, having a through hole 61'c to receive the shaft 62' (which will later be described) inserted therethrough, and protruding downward from the lower surface 612'. Around the second cylindrical member 617', the spring 64' (which will later be described) is arranged. The first cylindrical member 613', the protrusion 614', the rod member 615', the trapezoidal engaging portion 616', and the second cylindrical member 617' are formed integral with the base 61'.

Figure 5:
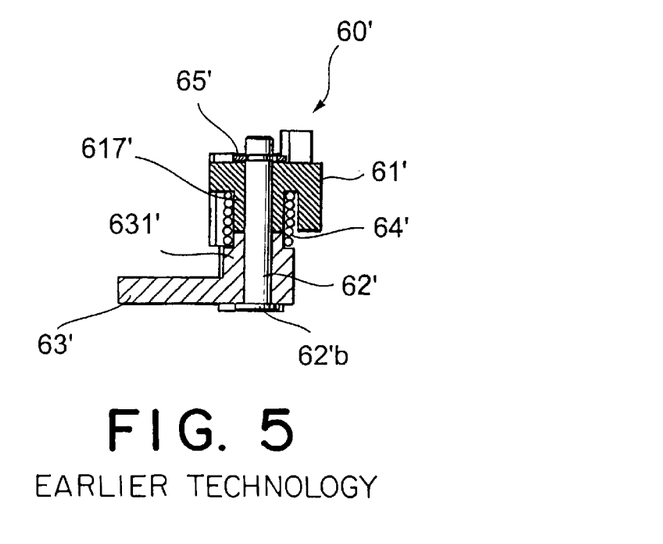
FIG. 5 is a sectional view taken along a line V—V in FIG. 4.

The shaft 62' serves as a rotation axis of the release arm 63' (which will later be described). More in detail, the shaft 62' has one end 62'a penetrating the through hole 61'c of the second cylindrical member 617' of the base 61'. The shaft 62' has the other end 62'b forming a head portion having a diameter greater than that of the shaft 62'. As illustrated in FIG. 5, the head portion 62'b serves as a supporting portion for rotatably supporting the release arm 63' (which will later be described) on its lower side. The shaft 62' has a narrow portion 62'c formed in the vicinity of the one end 62'a and narrower than the diameter of the shaft 62'. The E ring 65' is fitted over the narrow portion 62'c as illustrated in FIGS. 2 and 5. Thus, a combination of the narrow portion 62'c and the E ring 65' forms a thrust bearing for the shaft 62'.

The release arm 63' comprises a cylindrical portion 631' having a through hole 631'a for receiving the shaft 62' inserted therethrough, an arm portion 632' formed at a lower end of the cylindrical portion 631' and extending in a radial direction perpendicular to an extending direction of the shaft 62', and a hook-like protruding portion 633' formed at a general center of the cylindrical portion 631' and protruding in the radial direction. The hook-like protruding portion 633' is engaged with the other end 64'b of the spring 64' which will later be described.

As illustrated in FIG. 5, the spring 64' is arranged to cover an outer periphery of the second cylindrical member 617' of the base 61' and an outer periphery of an upper end of the cylindrical portion 631' of the release arm 63'. As described above, the one end 64'a of the spring 64' is engaged with the trapezoidal engaging portion 616' of the base 61' while the other end 64'b is engaged with the hook-like protrusion 633' of the release arm 63'. The spring 64' continuously urges the release arm 63' to rotate the release arm 63' around the shaft 62' in a counterclockwise direction E1, as illustrated in FIG. 4. Thus, the spring 64' serves as urging means for urging the release arm 63' around the shaft 62' in the counterclockwise direction E1.

If no external force acts upon an end 632'a of the arm portion 632' of the release arm 63', the arm portion 632' of the release arm 63' is engaged with the trapezoidal engaging portion 616' of the base 61' as illustrated in FIGS. 2 and 4. Thus, the trapezoidal engaging portion 616' inhibits the rotation of the release arm 63' in the counterclockwise direction E1.

On the other hand, if an external force acts upon the end 632'a of the arm portion 632' of the release arm 63' in a clockwise direction E2 as illustrated in FIG. 4, the release arm 63' alone is rotated clockwise around the shaft 62' against the urging force of the spring 64'. On the contrary, if an external force acts upon the end 632'a of the arm portion 632' of the release arm 63' in the counterclockwise direction E1 as illustrated in FIG. 4, the interpose lever 60' as a whole is rotated around the first cylindrical member 613' of the base 61' in a counterclockwise direction E3 as depicted in FIG. 4 because the rotation of the release arm 63' in the counterclockwise direction E1 is inhibited as described above.

When the tape cartridge (not shown) is inserted into the slot 11'b of the tape drive 10', the protrusion 614' of the base 61' is engaged with a recess (not shown) formed on the tape cartridge. Furthermore, the end 632'a of the arm portion 632' of the release arm 63' is applied with a clockwise or a counterclockwise force exerted by a cam surface of a ring cam (not shown).

The above-mentioned interpose lever 60' requires, as different components separate from the base 61', the shaft 62' serving as the rotation shaft for the release arm 63' and the E ring 65' constituting the thrust bearing. Thus, the interpose lever 60' has an increased number of components so that an assembling efficiency is degraded. As a consequence, it is difficult to reduce the cost of the interpose lever 60' and the tape drive 10'.

Figure 6:
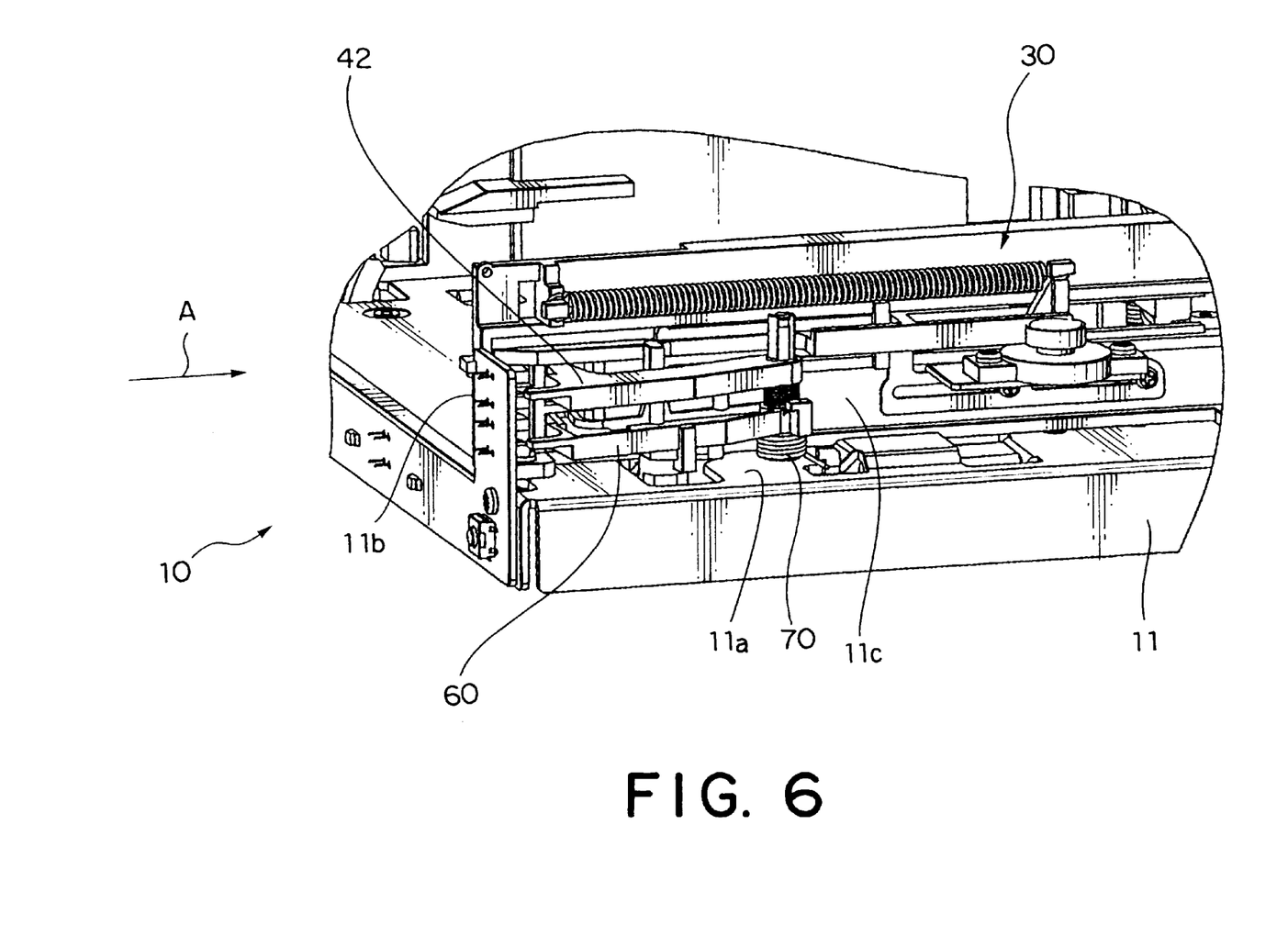
FIG. 6 is a perspective view of a part of a tape drive according to one embodiment of this invention in a state where an upper cover is removed.

Next referring to FIG. 6, description will be made of a tape drive according to one embodiment of this invention.

The tape drive depicted at 10 in the figure is adapted to receive a cartridge (not shown) and contains a take-up reel (not shown) therein. The take-up reel may be called a spool. The tape drive 10 comprises a generally rectangular housing 11 having a common base 11a. The base 11a has a first spindle motor (not shown) and a second spindle motor (not shown). The first spindle motor has a permanently mounted spool (take-up reel) permanently mounted to the base 11a and dimensioned to accept a magnetic tape (not shown) streaming at a relatively high speed. The second spindle motor is adapted to receive a removable cartridge. The removable cartridge is manually or automatically inserted into the tape drive 10 via a slot 11b formed on the housing 11 of the drive 10 in an inserting direction depicted by an arrow A.

When the cartridge is inserted into the slot 11b, the cartridge is engaged with the second spindle motor in a known manner. Prior to rotation of the first and the second spindle motors, the tape cartridge is connected to the permanently mounted spool by means of a mechanical buckling mechanism (not shown). A number of guide rollers (not shown) are positioned between the tape cartridge and the permanently mounted spool and guide the magnetic tape as it streams at a relatively high speed back and forth between the tape cartridge and the permanently mounted spool.

The tape drive 10 has a right side wall or right receiver 11c. An interpose lever 60 is rotatably attached onto the base 11a on the side of one surface (i.e. on the side opposite to the slot 11b) of the right receiver 11c. The interpose lever 60 is urged by a spring 70 in the manner which will later become clear. An eject mechanism 30 is attached to the one surface of the right receiver 11c of the tape drive 10. Above the interpose lever 60, a write protect arm 42 is rotatably attached to be coaxial with a rotation axis of the interpose lever 60.

Referring to FIGS. 7 through 10 in addition to FIG. 6, description will be made of the interpose lever 60.

Figure 7:
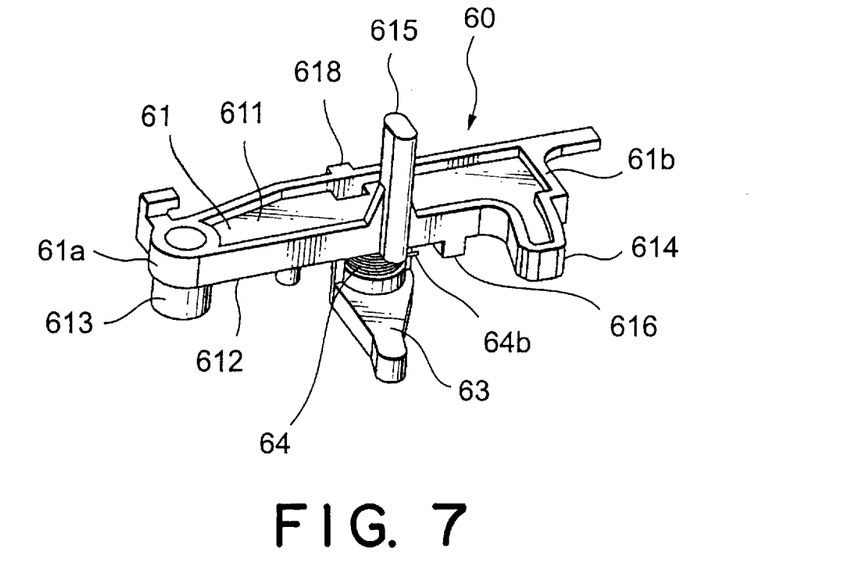
FIG. 7 is a perspective view of an interpose lever used in the tape drive illustrated in FIG. 6.
Figure 8:
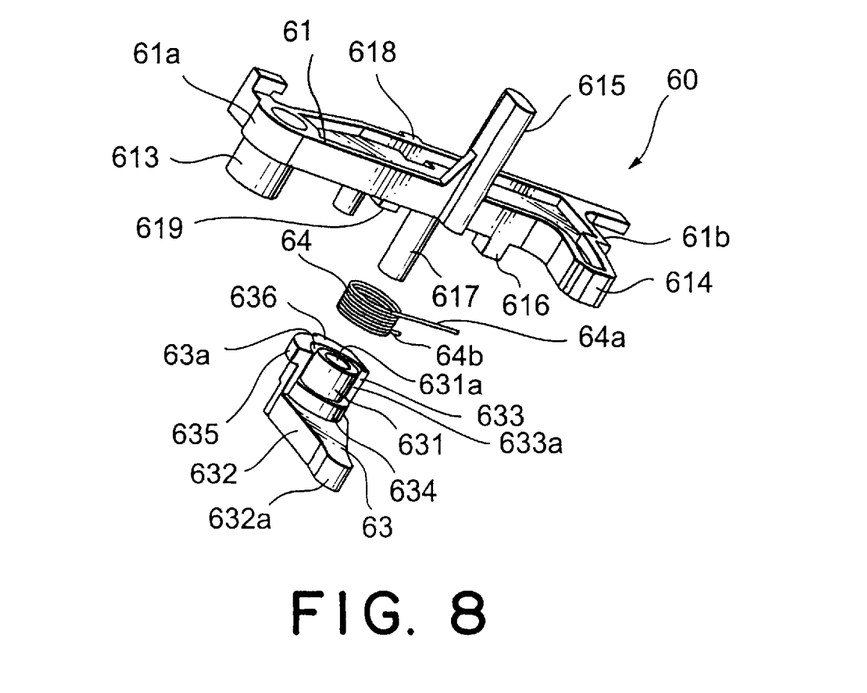
FIG. 8 is an exploded perspective view of the interpose lever illustrated in FIG. 7.

The interpose lever 60 comprises a base 61 having an upper surface 611 and a lower surface 612, a release arm 63, and a spring 64.

The base 61 is provided with a first cylindrical member 613 formed at its one end 61a and extending downward from the lower surface 612 to serve as the rotation center member or a shaft of the interpose lever 60. Furthermore, the base 61 is provided with a protrusion 614 formed at its the other end 61b and protruding towards the right receiver 11c (FIG. 6). The base 61 is provided with a rod member 615 formed at its general center near to the other end 61b and extending upward from the upper surface 611. The base 61 is provided with an engaging protrusion 616 formed between its center and the other end 61b on the side of the right receiver 11c and extending downward from the lower surface 612 to engage one end 64a of the spring 64 which will later be described. Furthermore, the base 61 is provided with a second cylindrical member 617 formed at its general center to serve as a rotation center member or a shaft of the release arm 63 (which will later be described). Thus, the second cylindrical member 613 is used as the shaft for rotating the release arm 63. Around the second cylindrical member 617, a cylindrical portion 631 of the release arm 63 (which will later be described) is arranged.

The base 61 is provided with a locking portion or stopper 618 formed at its center on the side opposite to the right receiver 11c (FIG. 6) and protruding downward from the lower surface 612 to limit a rotation range of the release arm 63 (which will later be described) and to lock the release arm 63, and a supporting portion 619 formed at an end of the locking portion 618 and perpendicularly bent inward therefrom to rotatably support the release arm 63 (which will later be described).

The first cylindrical member 613, the protrusion 614, the rod member 615, the engaging protrusion 616, the second cylindrical member 617, the locking portion 618, and the supporting portion 619 are formed integral with the base 11.

The release arm 63 comprises the cylindrical portion 631 having a through hole 631a for receiving the second cylindrical member 617 inserted therethrough, an arm portion 632 formed at a lower end of the cylindrical portion 631 and extending in a radial direction perpendicular to an extending direction of the second cylindrical member 617, a semicylindrical portion 633 spaced from the cylindrical portion 631 to cover an outer periphery of the cylindrical portion 631, and a ring portion 634 formed at a general center of the cylindrical portion 631 and protruding outward in a radial direction to connect the cylindrical portion 631 and the semicylindrical potion 633. Thus, a half ring groove 63a is defined between the cylindrical portion 631 and the semicylindrical portion 633 to receive the spring 64 (which will later be described). The ring portion 634 serves as a bottom of the half ring groove 63a.

The release arm 63 further comprises a first flange portion 635 formed at an upper end of the semicylindrical portion 633 and protruding outward in the radial direction, and a second flange portion 636 protruding further outward in the radial direction than the first flange portion 635. As illustrated in FIG. 5, the first flange portion 635 is supported on the supporting portion 619 of the base 61. In other words, the first flange portion 635 is located between the supporting portion 619 of the base 61 and the lower surface 612 of the base 61. Thus, a combination of the first flange portion 63 and the supporting portion 619 of the base 61 forms a thrust bearing for the second cylindrical member 617. On the other hand, the second flange portion 636 is formed at a position such that the second flange portion 636 is engageable with the locking portion 618 of the base 61 as illustrated in FIGS. 9 and 10.

Figure 9:
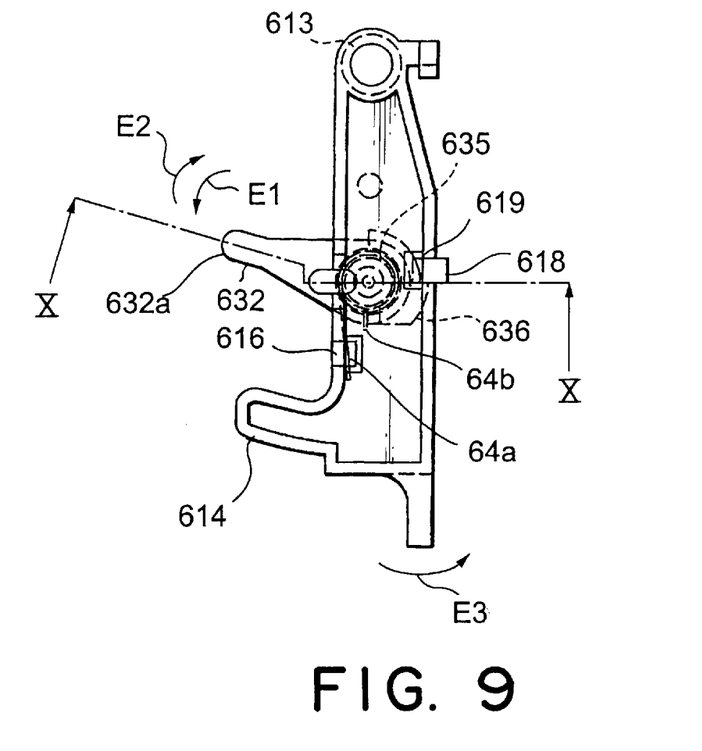
FIG. 9 is a plan view of the interpose lever illustrated in FIG. 7.
Figure 10:
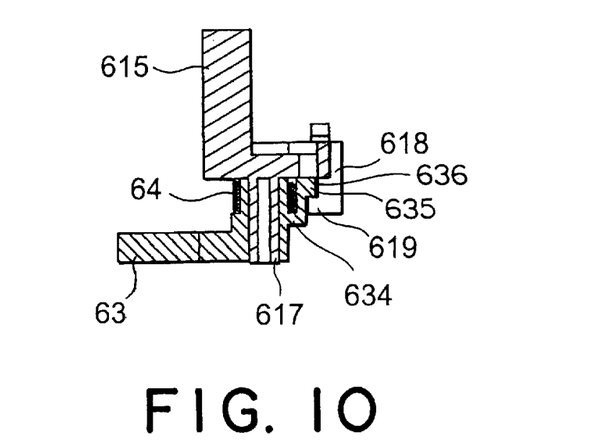
FIG. 10 is a sectional view taken along a line X—X in FIG. 9.

As illustrated in FIG. 10, the spring 64 is received in the half ring groove 63a on the ring portion 634 of the base 61. As illustrated in FIG. 9, the one end 64a of the spring 64 is engaged with the engaging protrusion 616 of the base 61 as described above. The other end 64b is engaged with one end face 633a of the semicylindrical portion 633 of the release arm 63 as illustrated in FIGS. 7 and 9. The spring 64 continuously urges the release arm 63 to rotate the release arm 63 around the second cylindrical member 617 in a counterclockwise direction E1 as illustrated in FIG. 9. Thus, the spring 64 serves as urging means for urging the release arm 63 around the second cylindrical member 617 in the counterclockwise direction E1.

If no external force acts upon an end 632a of the arm portion 632 of the release arm 63, the second flange portion 636 of the release arm 63 is engaged with the locking portion 618 of the base 61 as illustrated in FIG. 9. Thus, the locking portion 618 inhibits the rotation of the release arm 63 in the counterclockwise direction E1.

On the other hand, if an external force acts upon the end 632a of the arm portion 632 of the release arm 63 in a clockwise direction E2 as illustrated in FIG. 9, the release arm 63 alone is rotated clockwise around the second cylindrical member 617 against the urging force of the spring 64. On the contrary, if an external force acts upon the end 632a of the arm portion 632 of the release arm 63 in the counterclockwise direction E1 as illustrated in FIG. 9, the interpose lever 60 as a whole is rotated around the first cylindrical member 613 of the base 61 in a counterclockwise direction E3 as depicted in FIG. 9 because the rotation of the release arm 63 in the counterclockwise direction E1 is inhibited as described above.

When the tape cartridge is inserted into the slot 11b of the tape drive 10, the protrusion 614 of the base 61 is engaged with a recess (which will later be described) formed on the tape cartridge, as will later be described in detail. Furthermore, the end 632a of the arm portion 632 of the release arm 63 is applied with a clockwise or a counterclockwise force exerted by a cam surface of a ring cam (which will later be described).

In the above-mentioned structure of this embodiment, the base 61 of the interpose lever 60 is integral with the second cylindrical member 617 as the rotation axis of the release arm 63 and the supporting portion 619. As compared with the existing interpose lever 60', the number of components is reduced so that the number of assembling steps is reduced. This makes it possible to reduce the cost of the interpose lever 60.

Figure 11:
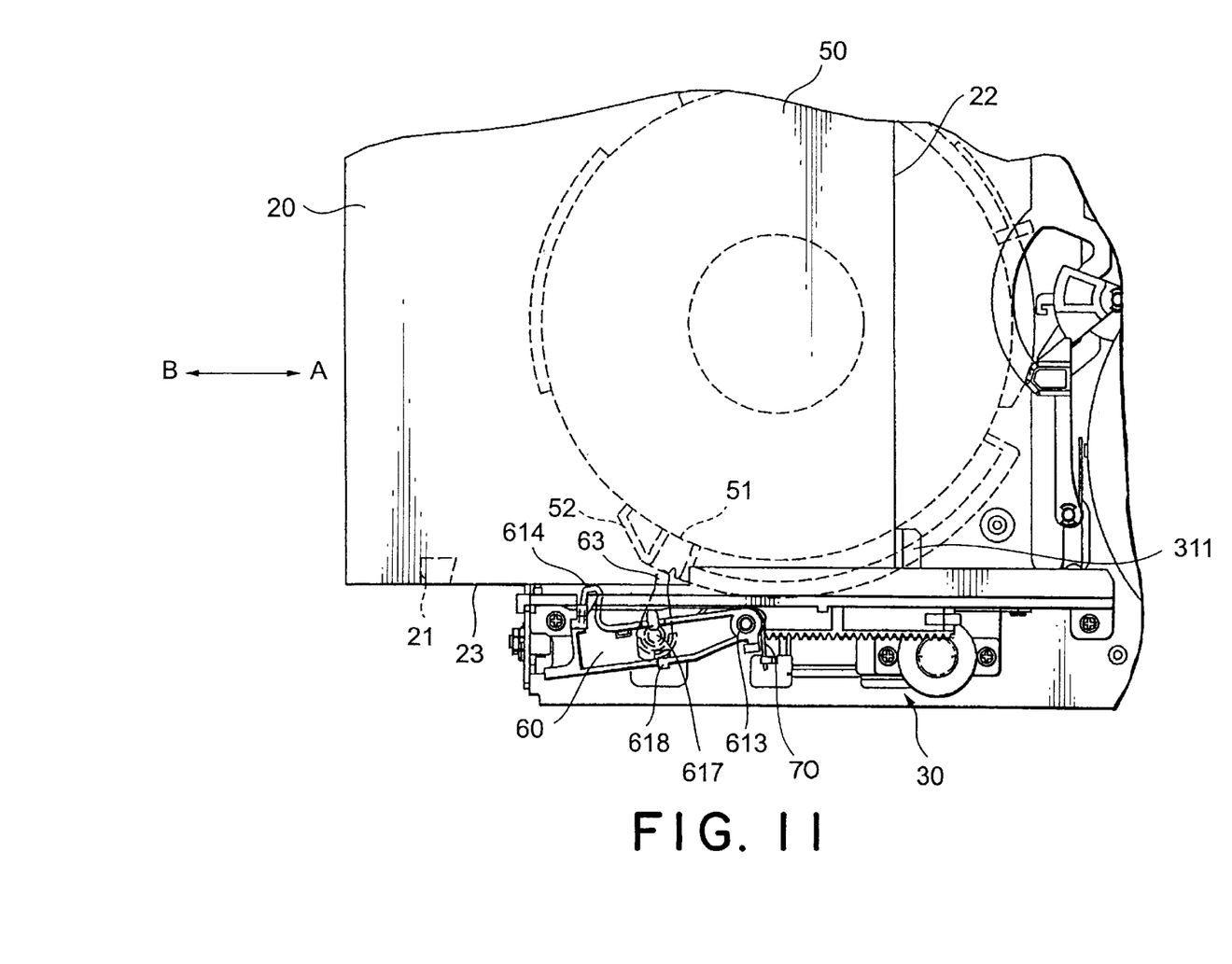
FIG. 11 is a plan view for describing the relationship between the interpose lever and a ring cam at the start of insertion of a cartridge (or at the completion of ejection)
Figure 12:
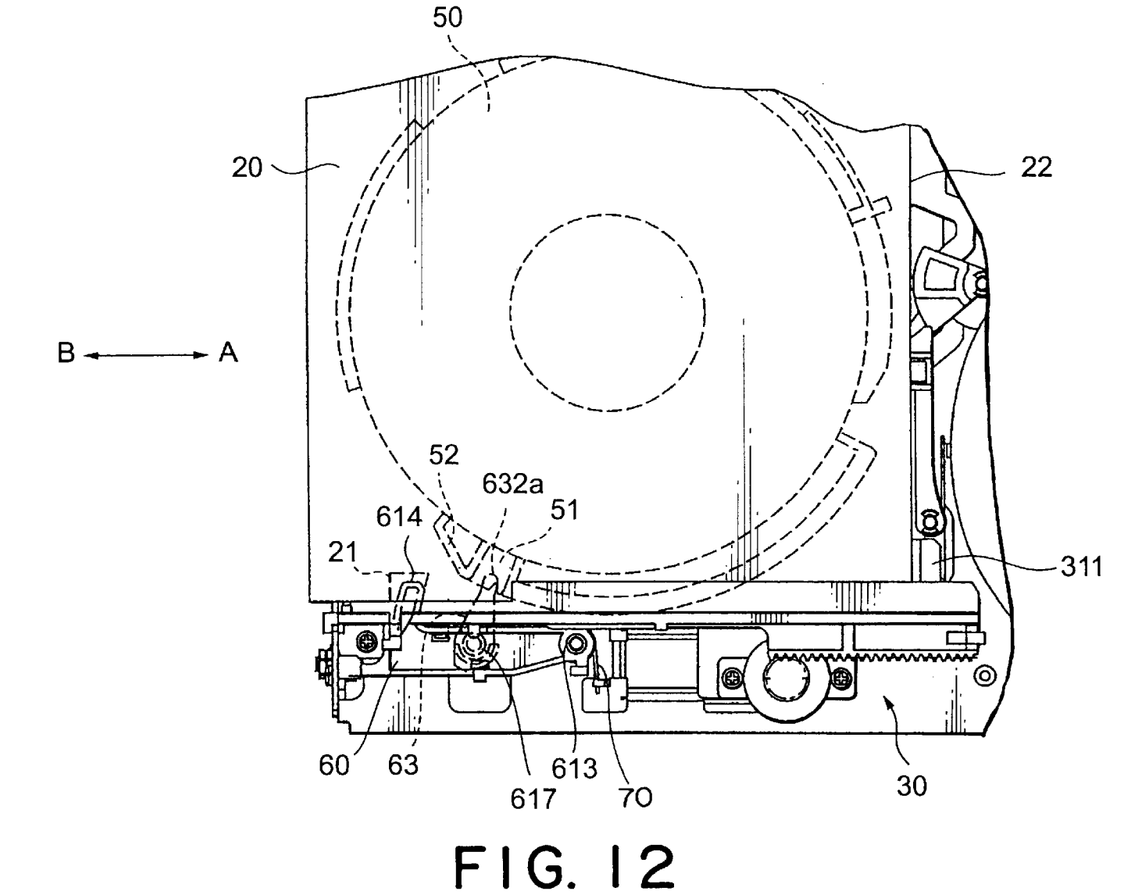
FIG. 12 is a plan view for describing the relationship between the interpose lever and the ring cam at the completion of insertion of the cartridge.
Figure 13:
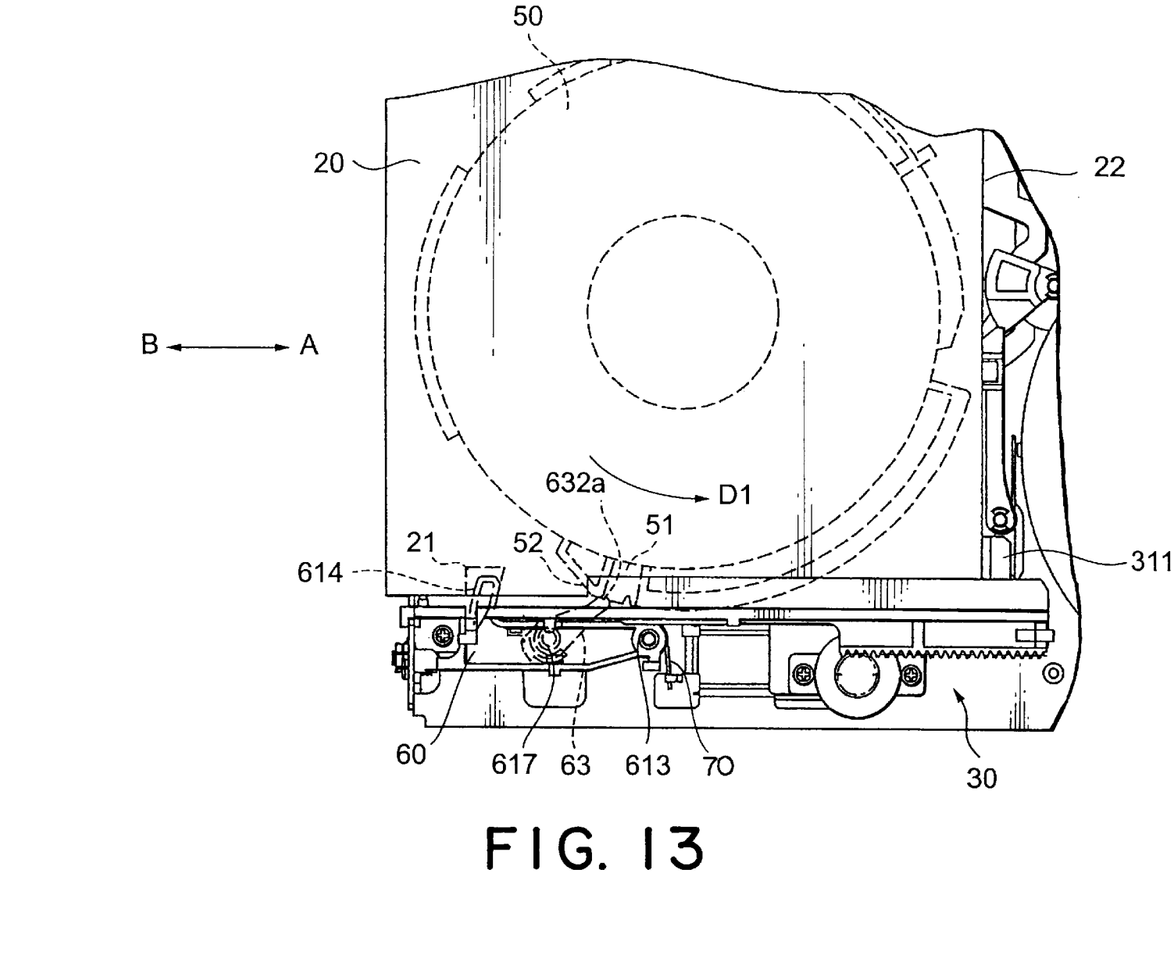
FIG. 13 is a plan view for describing the relationship between the interpose lever and the ring cam at the start of loading.
Figure 14:
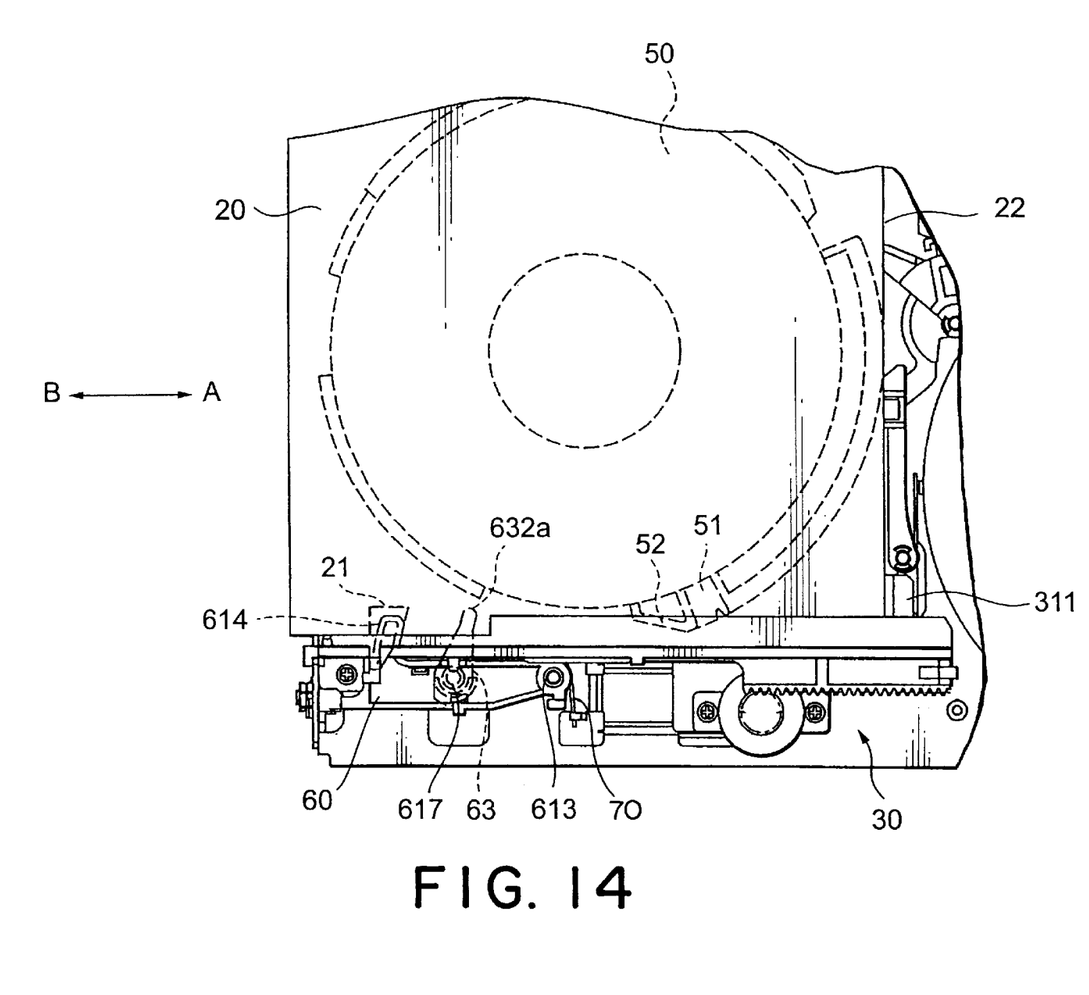
FIG. 14 is a plan view for describing the relationship between the interpose lever and the ring cam at the completion of loading.
Figure 15:
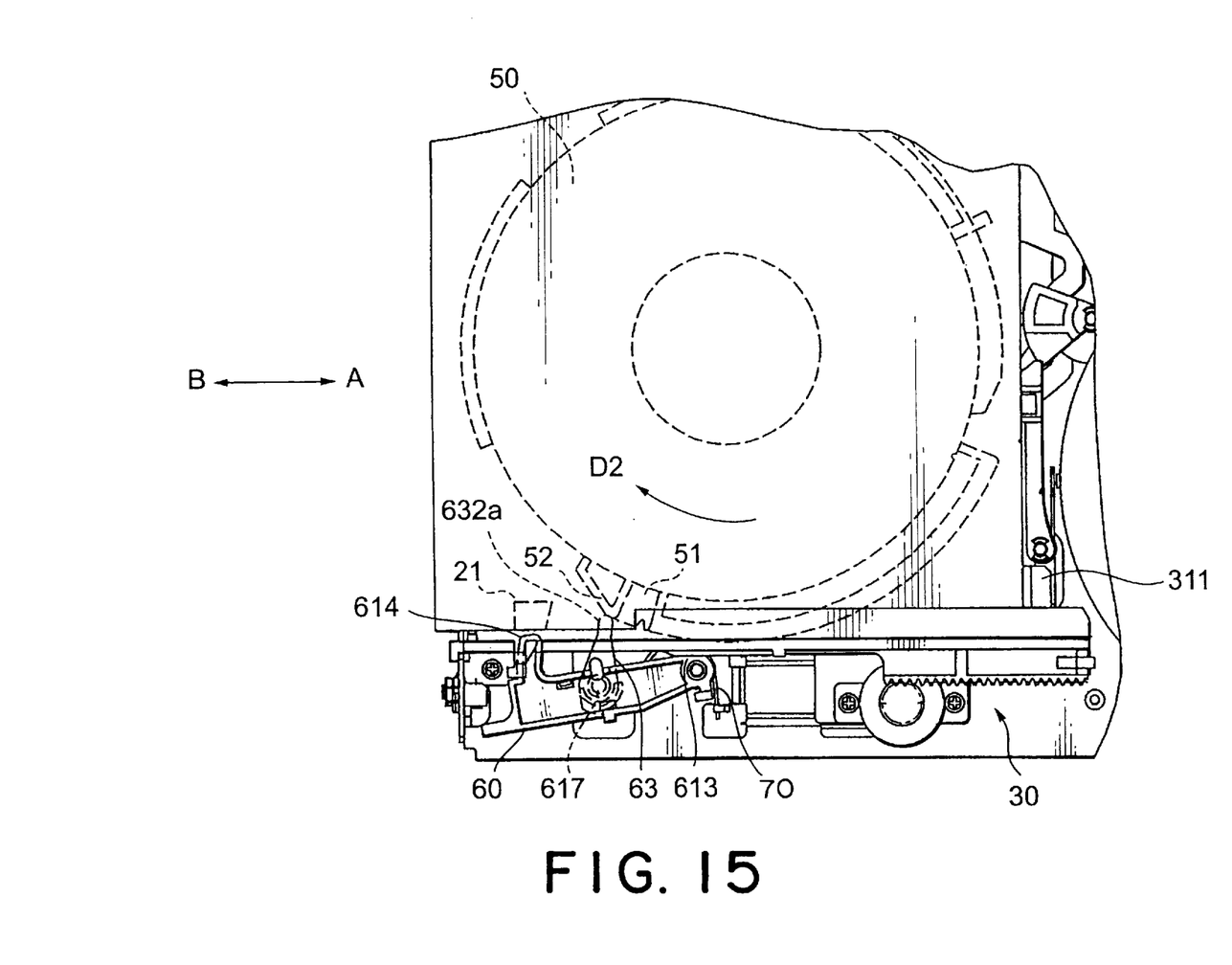
FIG. 15 is a plan view for describing the relationship between the interpose lever and the ring cam during an ejecting operation.

Next referring to FIGS. 11 through 15, description will be made of the relationship between the interpose lever 60 and the ring cam 50. FIG. 11 is a plan view showing the relationship between the interpose lever 60 and the ring cam 50 at the start of insertion of the cartridge depicted by 20 in the figure as well as the relationship between the interpose lever 60 and the ring cam 50 at the completion of ejection. FIG. 12 is a plan view showing the relationship between the interpose lever 60 and the ring cam 50 at the completion of insertion of the cartridge 20. FIG. 13 is a plan view showing the relationship between the interpose lever 60 and the ring cam 50 at the start of loading. FIG. 14 is a plan view showing the relationship between the interpose lever 60 and the ring cam 50 at the completion of loading. FIG. 15 is a plan view showing the relationship between the interpose lever 60 and the ring cam 50 during an ejecting operation. The ring cam 50 may be called a loading ring and comprises a circular disc-shaped member. In FIGS. 11 through 15, the eject mechanism 30 of the tape drive 10 has a preselected ejecting amount or stroke of 30 mm.

As described above, the interpose lever 60 has the protrusion 614 to be engaged with the recess 21 of the cartridge 20 when the cartridge 20 is inserted into the tape drive 10, and the release arm 63 having the end 632a extending towards the ring cam 50 and attached to the interpose lever 60 to be rotatable around the second cylindrical member 617. The release arm 63 is continuously urged by the spring 64 counterclockwise around the second cylindrical member 617 but is inhibited by the locking portion 618 from counterclockwise rotation beyond the position illustrated in FIG. 11. However, if the end 632a of the release arm 63 is applied with a clockwise rotation force, the release arm 63 is rotatable clockwise around the second cylindrical member 617 against the urging force of the spring 64.

On the other hand, the ring cam 50 has a cam groove 51 and a cam surface 52 close to the cam groove 51 in the clockwise direction. Before the cartridge 20 is inserted into the tape drive 10, the end 632a of the release arm 63 is faced to the cam groove 51 as illustrated in FIG. 11.

At first referring to FIGS. 11 and 12, description will be made of an operation of inserting the cartridge 20 into the tape drive 10.

When the cartridge 20 is inserted into the slot 11b of the tape drive 10 in the inserting direction A, the interpose lever 60 is rotated around the first cylindrical member 613 counterclockwise against the urging force by urging means such as a spring (not shown). When the cartridge 20 is continuously inserted, a front end face 22 of the cartridge 20 is engaged with an engaging portion 311 of the eject mechanism 30, as illustrated in FIG. 11.

When the cartridge 20 is inserted further, the interpose lever 60 is rotated clockwise around the first cylindrical member 613 by the urging force of the spring 70 so that the protrusion 614 is engaged with the recess 21 of the cartridge 20 as illustrated in FIG. 7. At this time, the end 632a of the release arm 63 of the interpose lever 60 is slightly inserted into the cam groove 51 of the ring cam 50. Thus, the cartridge 20 is completely inserted into the slot 11b of the tape drive 10. After completion of insertion of the cartridge 20, a loading operation is carried out. The loading operation is carried out by rotating the ring cam 50 counterclockwise. The ring cam 50 is driven by driving means, such as a motor and a gear train (not shown). The driving means is controlled in its driving operation by a control unit (not shown).

Next referring to FIGS. 13 and 14, description will be made of the loading operation. When the control unit is informed of the completion of insertion of the cartridge 20 into the tape drive 10 by a detection signal from any detecting means (not shown), the control unit controls the driving means to drive the rotation of the ring cam 50 in a counterclockwise direction depicted by an arrow D1 as illustrated in FIG. 8. When the ring cam 50 is rotated in the counterclockwise direction D1, the cam surface 52 of the ring cam 50 is engaged with the end 632a of the release arm 63 of the interpose lever 60. Then, following the rotation of the ring cam 50 in the counterclockwise direction D1, the release arm 63 is rotated clockwise around the second cylindrical member 617 against the urging force by the spring 64.

When the ring cam 50 is continuously rotated in the counterclockwise direction D1, the cam surface 52 of the ring cam 50 and the end 632a of the release arm 63 are disengaged. The release arm 63 is rotated counterclockwise around the second cylindrical member 617 under the urging force of the spring 64 to be returned to its initial position. When the ring cam 50 is rotated by the driving means over a predetermined angle in the counterclockwise direction D1, the loading operation is completed. FIG. 9 illustrates the state where the loading operation is completed.

Next referring to FIGS. 15 and 11, description will be made of an operation of ejecting the cartridge from the tape drive 10.

The tape drive 10 has a front bezel (not shown) provided with an eject button (not shown). When an operator operates or presses the eject button, an ejecting request is transmitted to the control unit. In response to the ejecting request, the control unit controls the driving means to drive the rotation of the ring cam 50 in a clockwise direction depicted by an arrow D2 as illustrated in FIG. 15 over the predetermined angle from the position illustrated in FIG. 14.

When the ring cam 50 is rotated in the clockwise direction D2, the end 632a of the release arm 63 of the interpose lever 60 is engaged with the cam surface 52 of the ring cam 50 as illustrated in FIG. 15. As described above, the release arm 63 is inhibited from the rotation around the second cylindrical member 617 in the counterclockwise direction. Therefore, the release arm 63 can not be rotated around the second cylindrical member 617 in the counterclockwise direction. In this event, as illustrated in FIG. 15, the release arm 63 is not rotated but the end 632a climbs up over the cam surface 50 to move in sliding contact therewith. As a consequence, the interpose lever 60 itself is rotated around the first cylindrical member 613 in the counterclockwise direction. Thus, as illustrated in FIG. 15, the protrusion 614 of the interpose lever 60 is disengaged from the recess 21 of the cartridge 20.

By the above-mentioned disengagement, the eject mechanism 30 makes the cartridge 20 move or slide in a removing direction or an ejecting direction. As illustrated in FIG. 11, an end of the protrusion 614 of the interpose lever 60 is brought into frictional contact with a right side surface 23 of the cartridge 20.

What is claimed is:

1. An interpose lever for holding a removable tare cartridge in a tape drive, comprising:
    a movable base having a protrusion adapted to be engaged with a recess formed on said tape cartridge to inhibit said tape cartridge from being released;
    a release arm rotatably attached to said base for releasing engagement between said protrusion and said recess;
    urging means for urging said release arm in a predetermined rotating direction; and
    a shaft formed integrally with said base to serve as a rotation center member for said release arm;
    wherein said release arm comprises:
        a cylindrical portion fitted over said shaft,
        an arm portion extending radially outward from said cylindrical portion and adapted to be engaged with said tape cartridge upon releasing the engagement between said protrusion and said recess; and
        a semicylindrical portion extending along an outer periphery of said cylindrical portion to define a half ring groove between said cylindrical portion and said semicylindrical portion, wherein said urging means is located in said half ring groove.

2. The interpose lever according to claim 1, further comprising a supporting portion formed integrally with said base and supporting said release arm so that said release arm is rotatable around said shaft.

3. The interpose lever according to claim 1, further comprising a locking portion formed integrally with said base for limiting a rotation range of said release arm.

4. The interpose lever according to claim 1, further comprising a supporting portion formed integrally with said base,
    wherein said release arm further comprises a first flange portion protruding radially outward from said semicylindrical portion, and wherein said first flange portion is supported by said supporting portion in an axial direction.

5. The interpose lever according to claim 1, wherein said release arm further comprises a ring portion connecting said semicylindrical portion to an axially intermediate portion of said cylindrical portion.

6. The interpose lever according to claim 5, further comprising a locking portion formed integrally with said base,
    wherein said release arm further comprises a second flange portion protruding radially outward from said first flange portion, and wherein said second flange portion is engaged with said locking portion in said rotating direction so as to limit a rotation range of said release arm.

7. A tape drive comprising:
    (i) a housing having a slot for receiving a tape cartridge containing a tape;
    (ii) an interpose lever provided in said housing for holding a removable tape cartridge in a tape drive, comprising:
        (a) a movable base having a protrusion adapted to be engaged with a recess formed on said tape cartridge to inhibit said tape cartridge from being released;
        (b) a release arm rotatably attached to said base for releasing engagement between said protrusion and said recess; wherein said release arm comprises:
            a cylindrical portion fitted over said shaft,
            an arm portion extending radially outward from said cylindrical portion and adapted to be engaged with said tape cartridge upon releasing the engagement between said protrusion and said recess; and
            a semicylindrical portion extending along an outer periphery of said cylindrical portion to define a half ring groove between said cylindrical portion and said semicylindrical portion;
        (c) urging means for urging said release arm in a predetermined rotating direction, wherein said urging means is located in said half ring groove; and
        (d) a shaft formed integrally with said base to serve as a rotation center member for said release arm; and
    (iii) a tape driving mechanism assembled to said housing for moving said tape in said tare cartridge loaded in said slot.

8. The tape drive according to claim 7, wherein said interpose lever further comprises a supporting portion formed integrally with said base and supporting said release arm so that said release arm is rotatable around said shaft.

9. The tape drive according to claim 7, wherein said interpose lever further comprises a locking portion formed integrally with said base for limiting a rotation range of said release arm.

10. The tape drive according to claim 7, wherein said release arm further comprises a ring portion connecting said semicylindrical portion to an axially intermediate portion of said cylindrical portion.

11. The tape drive according to claim 7, wherein said interpose lever further comprises a supporting portion formed integral with said base, and
    wherein said release arm further comprises a first flange portion protruding radially outward from said semicylindrical portion, and said flange portion is supported by said supporting portion in an axial direction.

12. The tape drive according to claim 11, wherein said interpose lever further comprises a locking portion formed integral with said base, and
    wherein said release arm having a second flange portion protruding radially outward from said first flange portion, and said second flange portion is engaged with said locking portion in said rotating direction so as to limit a rotation range of said release arm.

* * * * *